United States Patent
Lee et al.

(10) Patent No.: US 10,692,470 B2
(45) Date of Patent: Jun. 23, 2020

(54) REFRIGERATOR WITH INTERACTIVE DISPLAY AND CONTROL METHOD THEREOF

(71) Applicant: LG Electronics Inc., Seoul (KR)

(72) Inventors: Jaeyoung Lee, Seoul (KR); Seungcheol Baek, Seoul (KR); Jeonghwa Yang, Seoul (KR); Eunjung Suh, Seoul (KR); Eungyeong Gwon, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/252,220

(22) Filed: Jan. 18, 2019

(65) Prior Publication Data

US 2019/0197993 A1 Jun. 27, 2019

Related U.S. Application Data

(63) Continuation of application No. 15/957,141, filed on Apr. 19, 2018, now Pat. No. 10,224,007, which is a
(Continued)

(51) Int. Cl.
*F25D 23/02* (2006.01)
*F25D 29/00* (2006.01)
(Continued)

(52) U.S. Cl.
CPC ............ *G09G 5/30* (2013.01); *F25D 23/02* (2013.01); *F25D 29/00* (2013.01);
(Continued)

(58) Field of Classification Search
CPC ........ F25D 11/00; F25D 23/02; F25D 23/028; F25D 29/00; F25D 29/005;
(Continued)

(56) References Cited

U.S. PATENT DOCUMENTS 6,722,142 B1 * 4/2004 Pagel ..................... F25D 21/14
 62/131
2002/0003531 A1 1/2002 Kim
(Continued)

FOREIGN PATENT DOCUMENTS

CN 102889747 1/2013
CN 202734398 2/2013
(Continued)

OTHER PUBLICATIONS

JP 2004-028542 (English Translation) (Year: 2004).*
U.S. Office Action in U.S. Appl. No. 14/618,440, dated Aug. 2, 2017, 15 pages.

*Primary Examiner* — Jonathan Bradford
(74) *Attorney, Agent, or Firm* — Fish & Richardson P.C.

(57) ABSTRACT

A refrigerator includes a main body defining a storage compartment that is divided into a plurality of storage sections, and a door coupled to the main body to selectively open or close the storage compartment. The door includes a door glass having at least one transparent display area, and a door frame surrounding one or more edges of the door glass and configured to protect the door glass. The transparent display area is configured to display, based on being touched by a user, information on food stored in one or more of the plurality of storage sections that corresponds to the touched transparent display area.

13 Claims, 11 Drawing Sheets

Related U.S. Application Data continuation of application No. 14/618,440, filed on Feb. 10, 2015, now Pat. No. 9,972,284.

(51) Int. Cl.

| | | |
|---|---|---|
| *G09G 5/30* | (2006.01) | |
| *G06T 11/60* | (2006.01) | |
| *G06K 9/00* | (2006.01) | |
| *G09G 5/00* | (2006.01) | |

(52) U.S. Cl.
CPC .......... *G06K 9/00671* (2013.01); *G06T 11/60* (2013.01); *F25D 29/005* (2013.01); *F25D 2400/361* (2013.01); *F25D 2500/06* (2013.01); *F25D 2700/02* (2013.01); *F25D 2700/04* (2013.01); *G09G 5/00* (2013.01); *G09G 2340/12* (2013.01); *G09G 2354/00* (2013.01)

(58) Field of Classification Search
CPC ............. F25D 2323/02; F25D 2400/36; F25D 2400/361; F25D 2500/06
See application file for complete search history.

(56) References Cited

U.S. PATENT DOCUMENTS

| | | |
|---|---|---|
| 2010/0170289 A1 | 7/2010 | Graziano |
| 2011/0016910 A1 | 1/2011 | Bak |
| 2011/0126153 A1 | 5/2011 | Park |
| 2011/0164047 A1* | 7/2011 | Pance ................. G06F 1/1647 345/581 |
| 2013/0194167 A1* | 8/2013 | Yun ..................... H01L 27/3232 345/84 |
| 2013/0249827 A1* | 9/2013 | Jeong .................. G06F 3/0414 345/173 |
| 2014/0035850 A1 | 2/2014 | Shin |

FOREIGN PATENT DOCUMENTS

| | | | | |
|---|---|---|---|---|
| CN | 202734418 | | 2/2013 | |
| CN | 203011036 | | 6/2013 | |
| CN | 103423956 | | 12/2013 | |
| CN | 103423957 | | 12/2013 | |
| CN | 103426405 | | 12/2013 | |
| KR | 557436 | | 3/2006 | |
| KR | 2010061659 | | 6/2010 | |
| KR | 20100082759 A | * | 6/2010 | ............. F25D 23/02 |
| KR | 2012115751 | | 10/2012 | |

\* cited by examiner

REFRIGERATOR WITH INTERACTIVE DISPLAY AND CONTROL METHOD THEREOF

CROSS-REFERENCE TO RELATED APPLICATIONS

The present application is a continuation of U.S. application Ser. No. 15/957,141 filed on Apr. 19, 2018, which is a continuation of U.S. application Ser. No. 14/618,440 filed on Feb. 10, 2015, which claims the benefits of priority to Korean Patent Applications No. 10-2014-0016090 filed on Feb. 12, 2014, and 10-2014-0016091 filed on Feb. 12, 2014, which are herein incorporated by reference in their entirety.

TECHNICAL FIELD

The present disclosure relates to a refrigerator and a method for controlling the same.

BACKGROUND

When a door of a refrigerator is opaque, the door should be opened to check food stored in the refrigerator. However, whenever the door is opened, cold air in the refrigerator leaks to the outside and warm air is introduced into the refrigerator, causing an increase in power consumption of the refrigerator.

SUMMARY

Implementations of this disclosure provide a refrigerator for allowing a user to check a location of a food without opening a refrigerator door and check information on the food by touching a front surface part of the door while viewing the food, and a method for controlling the same.

Implementations of this disclosure also provide a refrigerator for allowing a user to select a recipe through a door glass, immediately check food materials that are currently retained among food materials required for the selected recipe, and purchase insufficient food materials through online shopping, and a method for controlling the same.

According to one aspect, a refrigerator includes a main body defining a storage compartment that is divided into a plurality of storage sections, and a door coupled to the main body to selectively open or close the storage compartment. The door includes a door glass having at least one transparent display area, and a door frame surrounding one or more edges of the door glass and configured to protect the door glass. The transparent display area is configured to display, based on being touched by a user, information on food stored in one or more of the plurality of storage sections that corresponds to the touched transparent display area.

Implementations according to this aspect may include one or more of the following features. For example, the door glass may be configured to be switchable between a transparent state and an opaque state. The transparent display area may be divided into a plurality of transparent display areas on the door glass, and the plurality of transparent display areas may be arranged on locations on the door glass that correspond to the plurality of storage sections. Each of the plurality of transparent display areas may be associated with corresponding coordinates on the door glass, and the plurality of transparent display areas may be configured to display a touch point of the user along with a corresponding food information image. The information on the stored food may include at least one of a name, an expiration date, an amount, or a price of the stored food. The plurality of transparent display areas may be configured to display an input screen for inputting food information corresponding to the storage section in which the food is stored.

According to another aspect, method for controlling a refrigerator having a door glass provided with at least one transparent display and a storage compartment divided into a plurality of storage sections for storing food includes detecting a touch on a front surface of the door glass and determining, based on the detected touch, a corresponding one of the plurality of storage sections in which a food of interest is stored. The method further includes displaying on the transparent display, based on the detected touch, one or more food information images along with a point of the touch or a food information input screen. In the refrigerator controlled according to this method, the door glass is configured to selectively open or close the storage compartment, and the door glass allows the food stored in the storage compartment to be visually checked based on the door glass being in the closed position.

Implementations according to this aspect may include one or more of the following features. For example, displaying on the transparent display may include displaying on the transparent display that is divided into a plurality of transparent display areas on the door glass, the plurality of transparent display areas being arranged on locations on the door glass that correspond to the plurality of storage sections, the plurality of transparent display areas being configured to be individually operated. The method may further include associating each of the plurality of transparent display areas and the touched point with corresponding coordinates on the door glass, wherein the food information image or the food information input screen is displayed on the transparent display area that corresponds to the coordinates of the touched point. The method may further include, based on a point within the transparent display being touched again or a set time being lapsed while the food information image is displayed on the transparent display, removing the food information image from the transparent display, and based on user input of the food information being completed, removing the food information input screen from the transparent display. The method may further include switching the door glass between a transparent state and an opaque state. The door glass may be switched into the opaque state based on the food information image or the food information input screen being removed from the transparent display or based on the set time having lapsed. The method may further include maintaining the door glass in the opaque state based on the door glass not being touched, and based on a touch on the door glass being recognized by a control unit or based on detection of a closing of the door following an opening of the door, switching the door glass into the transparent state. The method may further include, based on detection of the closing of the door following the opening of the door, switching the entirety of the door glass into the transparent state. The method may further include, based on the door glass being touched, switching only a specific display area that includes the touched point into the transparent state, or switching the entirety of the door glass into the transparent state. The method may further include setting a touch scheme for switching only the specific display area into the transparent state to be different from a touch scheme for switching the entirety of the door glass into the transparent state. The method may further include, based on the specific display area being touched again while the specific display area or the entirety of the door glass is in the transparent state, allowing a food information check or food information input. The method may further include setting a touch scheme for the food information check to be different from a touch scheme for the food information input. Displaying, on the transparent display, the one or more food information images may include displaying at least one of a name, an expiration date, an amount, or a price of a stored food. Displaying, on the transparent display, the food information input screen may include displaying an input window for inputting at least one of a name, a storage time, an expiration date, an amount, or a price of a stored food, displaying an input completion button for inputting an input completion instruction, and displaying a keyboard window for inputting a character.

According to yet another aspect, a refrigerator includes a main body defining a storage compartment, the storage compartment being divided into a plurality of storage sections, and a door coupled to the main body to selectively open or close the storage compartment. The door includes a door glass having at least one transparent display area, and a door frame surrounding one or more edges of the door glass and configured to protect the door glass. The transparent display area is configured to display, based on the transparent display area being touched by a user, a plurality of selectable menus that includes a recipe menu, and to display, based on the recipe menu being selected, information on a corresponding recipe and information on a retained food that is currently stored in the refrigerator. The transparent display area is also configured to display the information on the retained food on a location on the door glass that corresponds to a storage section in which the retained food is stored.

Implementations according to this aspect may include one or more of the following features. For example, the door glass may be configured to be switchable between a transparent state and an opaque state. The transparent display area may be divided into a plurality of transparent display areas on the door glass, and the plurality of transparent display areas may be arranged on locations on the door glass that correspond to the plurality of storage sections. Each of the plurality of transparent display areas may be associated with corresponding coordinates on the door glass, and the plurality of transparent display areas may be configured to display a touch point of the user along with corresponding a food information image. The information on the stored food may include at least one of a name, an expiration date, an amount, or a price of the stored food. The plurality of transparent display areas may be configured to display an input screen for inputting food information on the transparent display area corresponding to the storage section in which the food is stored.

According to still yet another aspect, a method for controlling a refrigerator having a door glass provided with at least one transparent display and a storage compartment divided into a plurality of storage sections for storing food, wherein the door glass is configured to selectively open or close the storage compartment, and wherein the door glass allows the food stored in the storage compartment to be visually checked based on the door glass being in the closed position, includes detecting a touch on a front surface of the door glass, and displaying, on the transparent display, a plurality of selectable menus that includes a recipe menu. Based on the recipe menu being selected, a food information image for a retained food material that is currently stored in the refrigerator among food materials required for a selected recipe is displayed on the transparent display. The food information image is displayed on a location corresponding to a storage section in which the retained food material is stored.

Implementations according to this aspect may include one or more of the following features. For example, displaying on the transparent display may include displaying on the transparent display that is divided into a plurality of transparent display areas on the door glass, the plurality of transparent display areas being arranged on locations on the door glass that correspond to the plurality of storage sections, the plurality of transparent display areas being configured to be individually operated. The method may further include maintaining the door glass in the opaque state before the touch on the door glass is detected, and based on the food information image for the retained food material being displayed, switching the transparent display area corresponding to the storage section in which the retained food material is stored into the transparent state. The method may further include switching the door glass into the opaque state before the touch on the door glass is detected, and switching, based on the touch being detected, the entirety of the door glass into the transparent state. The method may further include displaying the plurality of selectable menus in the form of a touch icon. The method may further include, based on the recipe menu being selected, displaying on the transparent display area recipe items stored in a memory of a control unit in the form of a touch icon such that one recipe may be selected by the user among the recipe items. The method may further include, based on the one recipe being touched and selected by the user, displaying information on a food material required for the selected recipe, and based on a retained food material viewing option being selected, displaying the food information image for the retained food material. The method may further include displaying a material shopping selection menu together with the food information image for the retained food material, and based on the material shopping selection menu being touched by the user, accessing the Internet and displaying an Internet shopping mall screen on the display area. The method may further include, based on a material shopping process being completed, switching the door glass into the opaque state automatically or in response to input of an instruction from the user.

The details of one or more implementations are set forth in the accompanying drawings and the description below. Other features will be apparent from the description and drawings, and from the claims.

BRIEF DESCRIPTION OF THE DRAWINGS

The patent or application file contains at least one drawing executed in color. Copies of this patent or application publication with color drawing(s) will be provided by the Office upon request and payment of the necessary fee.

DETAILED DESCRIPTION

Hereinafter, implementations of a refrigerator according to the present disclosure will be described in detail with reference to the accompanying drawings.

Figure 1:
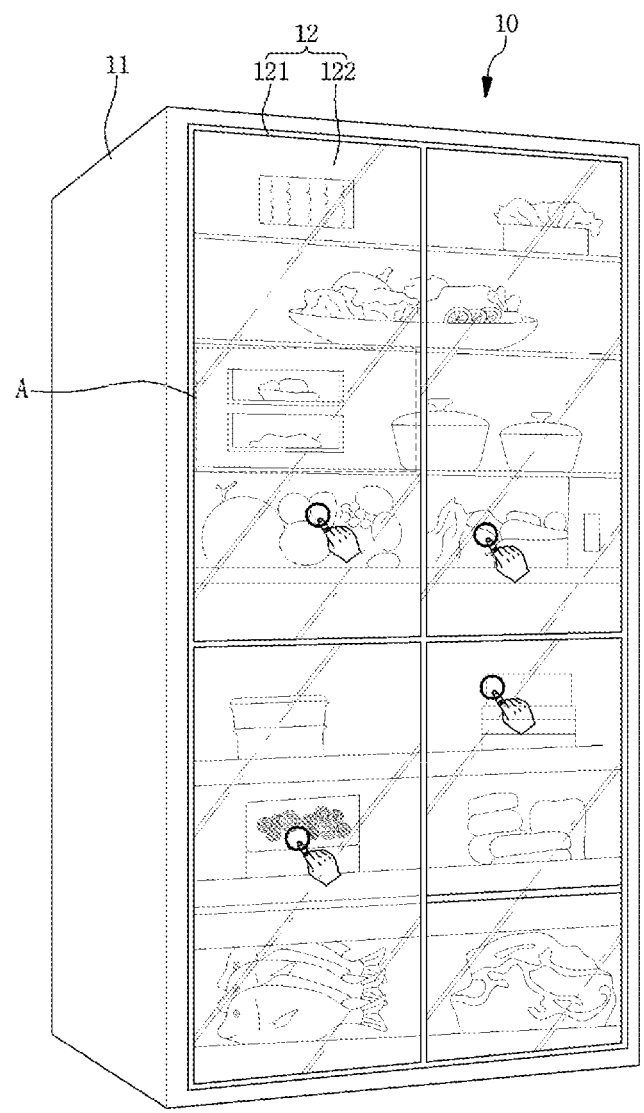
FIG. 1 is a perspective view showing an example refrigerator according to one implementation.
Figure 2:
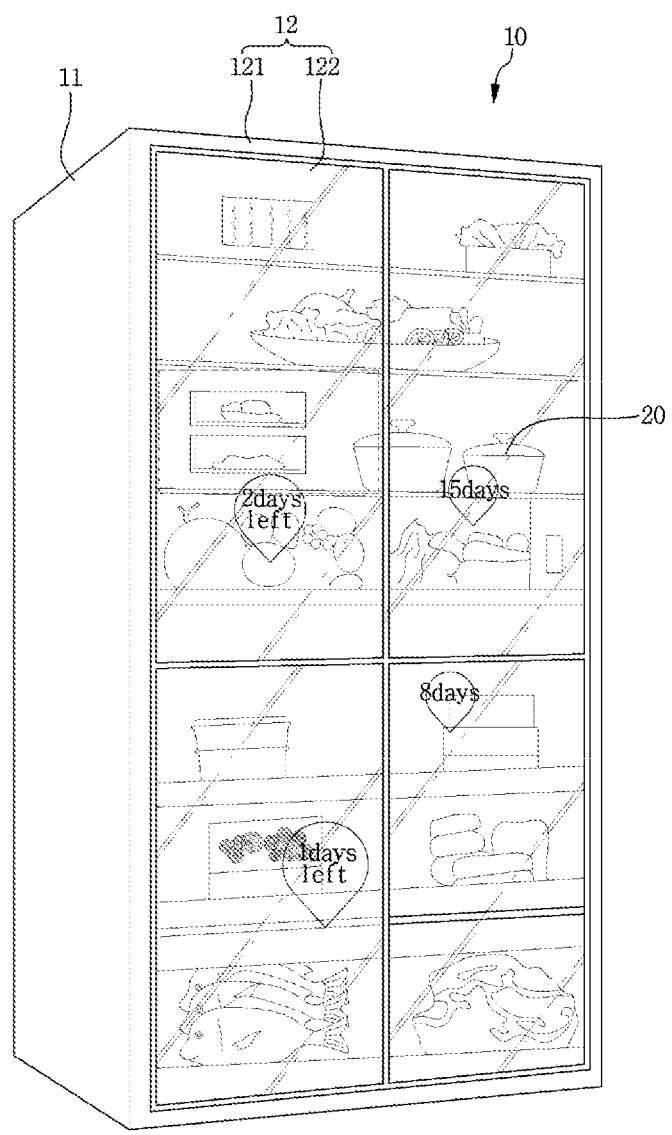
FIG. 2 is a perspective view of the refrigerator showing example state information on food stored therein.

Referring to FIGS. 1 and 2, a refrigerator 10 according to one implementation includes a cabinet 11 having a storage compartment formed therein and a door 12 connected to a front surface of the cabinet 11 to selectively open or close the storage compartment.

In more detail, the storage compartment may include one or both of a freezing compartment and a refrigerating compartment, and the door 12 may include a transparency-adjustable door glass 122 and a door frame 121 covering an outer rim of the door glass 122. The transparency of the door glass 122 may be adjusted between, for example, a complete opaque state and a complete transparent state so that food stored in the storage compartment may be visually checked even when the door 12 is closed. Further, information on food of interest may be displayed on the door glass 122. The door glass 122 may be made from glass or a glass-like material. In some cases, the door glass 122 may include regions that are fixed to be transparent and/or fixed to be opaque.

The door glass 122 may be provided with a transparent display panel for displaying texts, images, or videos. Furthermore, a plurality of display areas A may be arranged on a front surface of the door glass 122. In detail, each display area A may correspond to the area of a front surface part of a storage area divided by a shelf in the storage compartment. In other words, a vertical height of any one of the display areas A may correspond to a distance between shelves that are vertically adjacent to each other in the storage compartment, and a horizontal width of the one of the display areas A may correspond a width of the door glass 122 excluding the door frame 121. However, without being limited to this manner of division, the one of the display areas A may be further divided into a plurality of smaller display areas. In some cases, the display areas A may be enlarged to correspond to multiple storage sections.

In some cases, the display area A may be managed by a coordinate system. That is, four vertices of the display area A may be defined in terms of X and Y coordinates, and, when any point within the display area A is touched by a user, coordinates of the touched point may be recognized by a control unit. Furthermore, the control unit may render the entirety of the display area A including the touched point transparent, or may allow a display screen to be displayed on the display area A.

As described above, the display area may be formed on the door glass 122 for each storage section in the storage compartment, and each display area may be individually controlled. Therefore, information on food stored in a specific section of the storage compartment may be displayed on the display area positioned at the front of the specific section. As a result, a user may recognize various information on food stored in the refrigerator while viewing the food, without having to move his/her eyes too much vertically or horizontally.

When the user touches a certain point on the door glass 122 with a finger as illustrated in FIG. 1, a food information display image 20 for presenting information on food stored in a storage space corresponding to a touch point may be displayed on the display area A corresponding to the touch point as illustrated in FIG. 2.

For example, if the user checks a section of the storage compartment in which a fruit is stored through the door glass 122 that is transparent, and then touches a part of the door glass 122 corresponding to an area in which the fruit is stored, information on the fruit is displayed on the display area A. The information on the fruit may include the number of days left until an expiration date, as one example.

In the case where food items having different types or stored at different time points are stored in a specific section, if the display area A corresponding to the specific section is touched, the food information display images 20 for all of the food items stored in the specific section may be simultaneously displayed.

Figure 3:
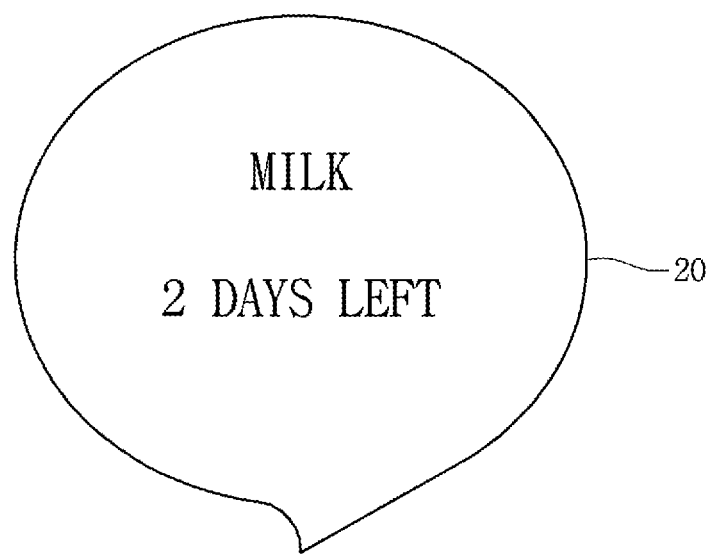
FIGS. 3 and 4 are diagrams illustrating examples of a food information display image displayed on a door glass of the refrigerator according to one implementation.
Figure 4:
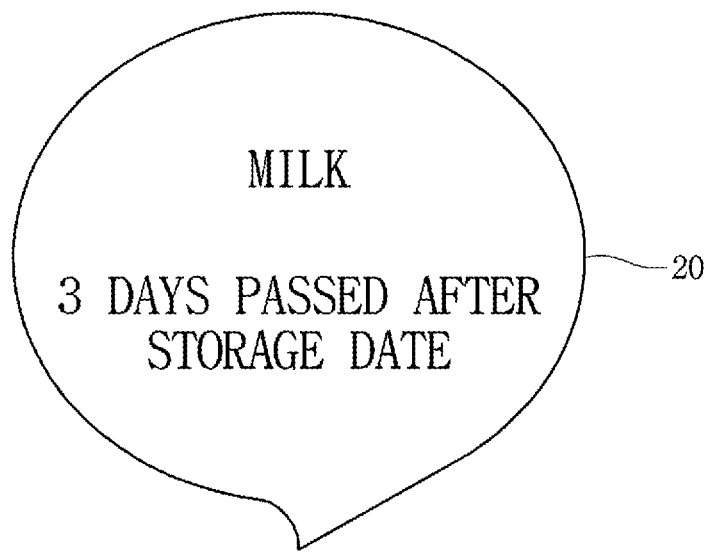

Referring now to FIG. 3, the food information display image may be displayed so as to notify a name of a specific food and the number of days left until an expiration date of the food. Referring also to FIG. 4, the food information display image may be displayed so as to notify the name of the specific food and the number of days that have elapsed from a storage date of the food. Furthermore, in the case of a food that has passed an expiration date, the food information display image may be displayed so as to notify the number of days that have elapsed from the expiration date.

Figure 5:
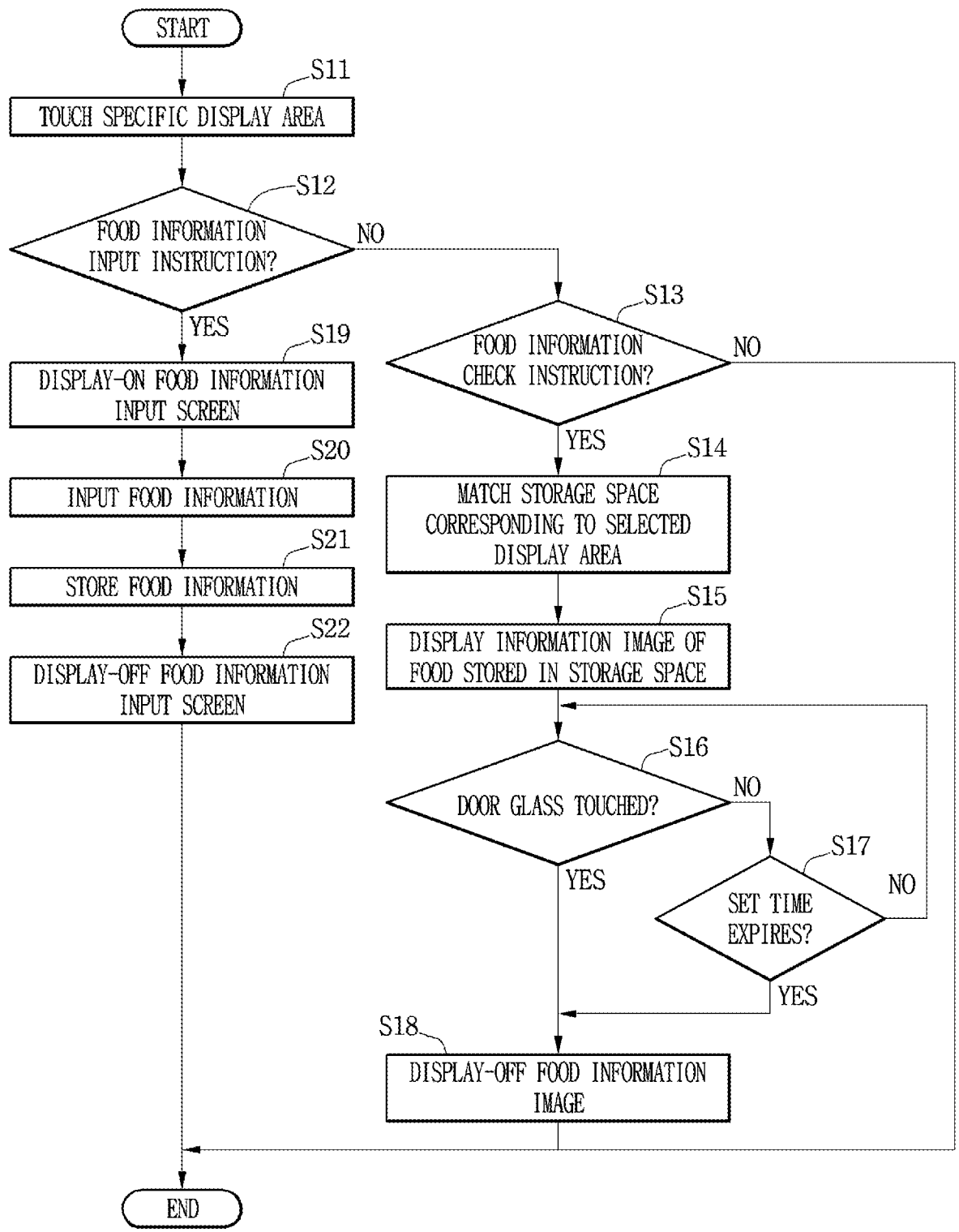
FIG. 5 is a flowchart illustrating an example method for controlling the refrigerator to input and check food information according to one implementation.

FIG. 5 illustrates an example method for controlling the refrigerator to input and check food information.

Referring to FIG. 5, the user touches the display area A on the door glass 122 to check food information or input storage information on a stored food. Here, it is assumed that the door glass 122 is in a transparent state and the display area A is in an activated state. In the activated state of the display area A, a touch motion of the user may be recognized and the food information may be displayed.

The control unit of the refrigerator 10 can determine whether the touch of the user is for inputting the food information or for checking the food information according to the type of the touch (S12, S13). It is preferable that a touch for inputting the food information be different from a touch for checking the food information.

For example, if the user touches a certain area of a front surface part of the door glass 122 for at least two seconds, i.e., touches on the certain area of the front surface part of the door glass 122, the control unit may recognize the touch as an instruction for inputting the food information. If the user performs a touch on and a touch off within one second, the control unit may recognize the touch as an instruction for checking the food information. There may be other various methods for differently setting a touch for inputting the food information and a touch for checking the food information so as to differentiate therebetween.

In some cases, if it is determined that an instruction for checking the food information is input since the user touches a front surface of the door glass 122 for less than one second, a storage space of the refrigerator corresponding to the display area A including a point touched by the user, i.e., the storage compartment, is matched (S14). Here, the matching of the storage space may be construed as performing, by the control unit, an algorithm for detecting a storage space corresponding to a touch area. A memory of the control unit may store, in the form of a look-up table, storage sections respectively corresponding to the plurality of display areas A on the door glass 122. That is, a plurality of display areas respectively corresponding to storage sections of the refrigerating compartment and storage sections of the freezing compartment are defined on each of the door glass 122 of the refrigerating compartment and the door glass 122 of the freezing compartment, and the display areas are programmed to be operated individually.

Therefore, the user can first check, visually through the door glass 122, what section of what storage compartment stores a food of interest. Then, the user can touch the display area of the door glass 122 located directly at the front of a storage section in which the food of interest is stored.

Here, each display area A has a size substantially similar to that of a front part of the storage section. Therefore, the user may touch any one point considered to correspond to an inner area of the storage section in which the food of interest is stored.

If coordinates of the touch point fall within coordinates that define the size of the display area A, an information image for the food of interest is displayed on the display area A corresponding to the storage section in which the food of interest is stored (S15). Furthermore, it is determined whether the front surface of the door glass 122 is touched again by the user (S16), or it is determined whether a set time expires after food information image is displayed (S17).

If it is determined that a certain point within the display area A is touched by the user after the food information is displayed on the display area A, or if it is determined that the set time expires after the food information is displayed on the display area A, the food information image 20 is displayed-off.

If the user touches on the door glass 122 for a set time or longer and the control unit recognizes the touch as an instruction for inputting the food information, a display screen for inputting the food information is displayed on the display area A. Here, in order to input information on a stored food, the user may touch the display area A located at the front of a storage section in which the food is stored.

In some cases, when the control unit receives the instruction for inputting the food information, the screen for inputting the food information is displayed on a selected display area A, i.e., the display area A including the touch point (S19). The screen for inputting the food information will be described in detail with reference to the drawings.

When the screen for inputting the food information is displayed, the user inputs the information on the stored food through the screen (S20). Here, the information on the stored food may include at least one of a name, expiration date, price, weight, and number/quantity of the stored food. Furthermore, in addition to the foregoing pieces of information, other various types of information may be input.

When the input of the food information is completed, the user can touch a storage completion button to complete a storage process (S21). Here, the storage completion button may be provided to one side of the food information input screen or the display area A in the form of an icon, so that a completion instruction is input when the user touches the button.

When the input of the food information is completed, the screen for inputting the food information is displayed-off (S22) so that the process of inputting the food information is completed.

As described above, the door glass 122 may be a transparency-adjustable glass. For example, the door glass 122 may be a smart glass for adjusting the transparency by controlling an intensity of current that flows thereto, more specifically, a smart glass made of an electrochromic material. Therefore, the door glass 122 may switch from an opaque state to a semi-transparent state or a completely transparent state.

When the door glass 122 is maintained in the completely transparent state, not only the user but also other persons may recognize all the foods stored in the refrigerator. In this state, it may be the case that the foods should not be allowed to be seen from the outside, for example, because the user has visitors. Furthermore, when the door glass 122 is maintained in the completely transparent state, radiant heat due to sun or other external light may increase a temperature in the refrigerator. Therefore, it may be necessary to allow the user to selectively render the door glass 122 transparent.

Figure 6:
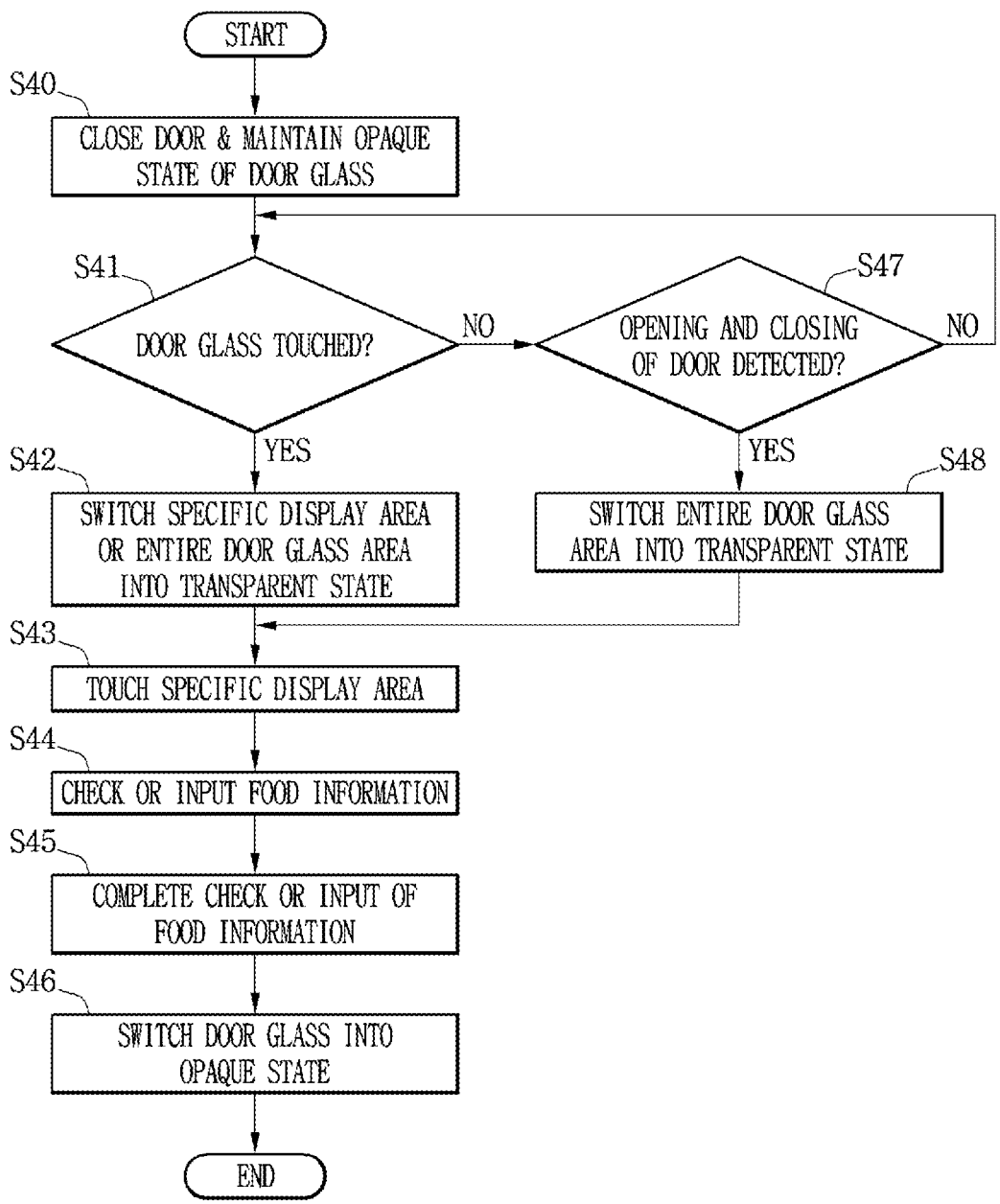
FIG. 6 is a flowchart illustrating an example method for controlling the refrigerator to input or check the food information through a transparency-adjustable door glass.

FIG. 6 illustrates an example method for controlling the refrigerator to input or check the food information through a transparency-adjustable door glass.

Referring to the implementation illustrated in FIG. 6, it is assumed that the door 12 is closed and the door glass 122 is maintained in the opaque state (S40). In other words, it is assumed that the door glass 122 is maintained in the opaque state while an event does not occur on the door glass 122.

In more detail, when the door glass 122 is opaque, an operation of switching the door glass 122 into the transparent state may first be performed. To this end, the control unit can determine whether the front surface of the door glass 122 is touched by the user (S41).

In some cases, in the case where the control unit detects that the door 12 is closed after being opened, the door glass 122 may be switched into the transparent state even though the door glass 122 is not touched by the user (S47). That is, since the door should be opened and closed to store a new food, the control unit may switch the entirety of the door glass 122 into the transparent state when detecting the opening and closing of the door so that the food information is input (S48).

Furthermore, since the control unit may be unable to recognize a storage section in which a food has been stored by the user, the entirety of the door glass 122 may be switched into the transparent state. In this case, after closing the door 12, the user may be allowed to input information on the food stored in the storage section by touching the display area A corresponding to the storage section while viewing the storage section through the transparent door glass.

When the control unit recognizes that a specific area of the door glass 122 is touched on, the door glass 122 may be switched into the transparent state. Here, according to a touch type, a part or the entirety of the door glass 122 may be switched into the transparent state. For examples, according to the number of times of touching the door glass 122, an area to be switched into the transparent state or a size of an area to be switched into the transparent state may be differently determined.

In detail, if the user touches the specific area of the door glass 122 one time, only the display area A including the touched point may be switched into the transparent state, and, if the user consecutively touches the specific area of the door glass 122 two times, the entirety of the door glass 122 may be switched into the transparent state (S42). Here, the motion of consecutively touching the door glass 122 two times may include a motion of consecutively pushing or knocking the door glass 122 two times.

When a specific display area of the door glass 122 or the entirety of the door glass 122 is switched into the transparent state, the user can touch the specific display area A again to input or check information on a food of interest while viewing the food (S43).

Thereafter, the food information may be input or checked according to the control method as described above with reference to FIG. 5 (S44).

When the input or checking of the food information is completed (S45), the door glass 122 may be switched into the opaque state. The door glass 122 may be switched into the opaque state immediately after the food information input screen is displayed-off (S22) or the food information image is displayed-off (S18) as described above with reference to FIG. 5.

Figure 7:
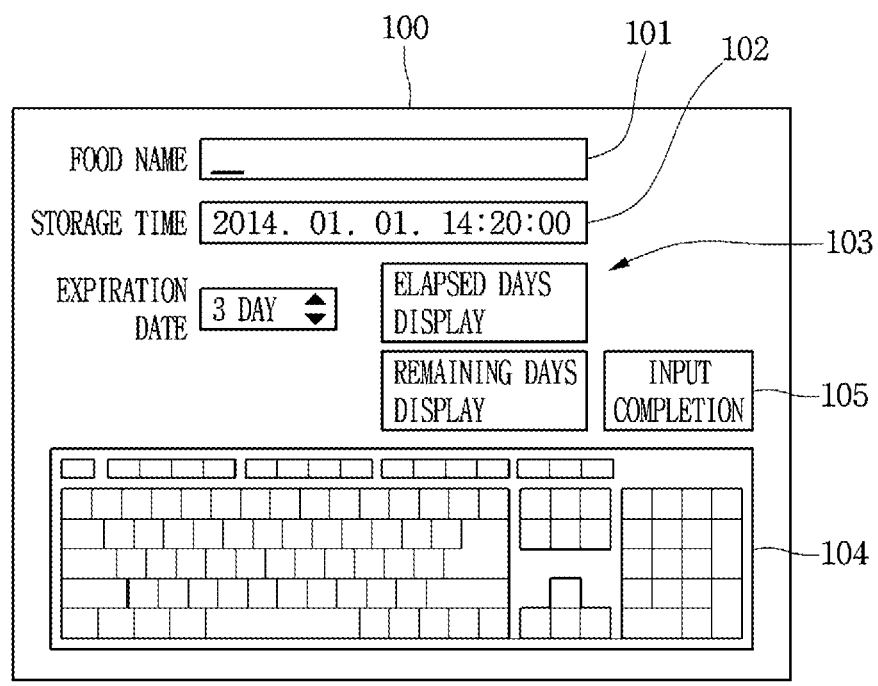
FIG. 7 is a diagram illustrating an example food information input screen.

FIG. 7 illustrates an example food information input screen.

Referring to FIG. 7, when the door glass 122 is touched to input the food information, a food information input screen 100 may be presented in the form of a transparent display.

In more detail, a food name input window 101, a storage time display window 102, an expiration date input window 103, and a keyboard window 104 may be arranged on the food information input screen 100. Furthermore, windows for inputting various information such as the number, weight, and price of food may be provided. Accordingly, the user may input a food name through a keyboard displayed on the keyboard window 104. Furthermore, the user may set an expiration date, and may touch one of an elapsed days display icon or a remaining days display icon to select an expiration date display method.

The storage time display window 102 may be programmed so that the user inputs a date and time or the time controlled by the control unit and displayed on the door glass 122 is automatically input and stored.

When the input of information is completed, an input completion window 105 may be touched so that the food information input screen 100 is displayed-off. Furthermore, the door glass 122 may be switched into the opaque state at the same time as when the food information input screen 100 is displayed-off or after a set time expires.

As described above, according to the refrigerator according to one implementation, the user may immediately check information on a stored food while viewing the stored food through a transparency-adjustable door glass on which a transparent display is presented. Furthermore, since it is not necessary to open the door to check the food information, the power consumption of the refrigerator may be reduced.

Described below is a method for controlling the refrigerator that includes the transparent door glass to allow the user to check information on a food required for a specific recipe and purchase required foods through online shopping.

Figure 8:
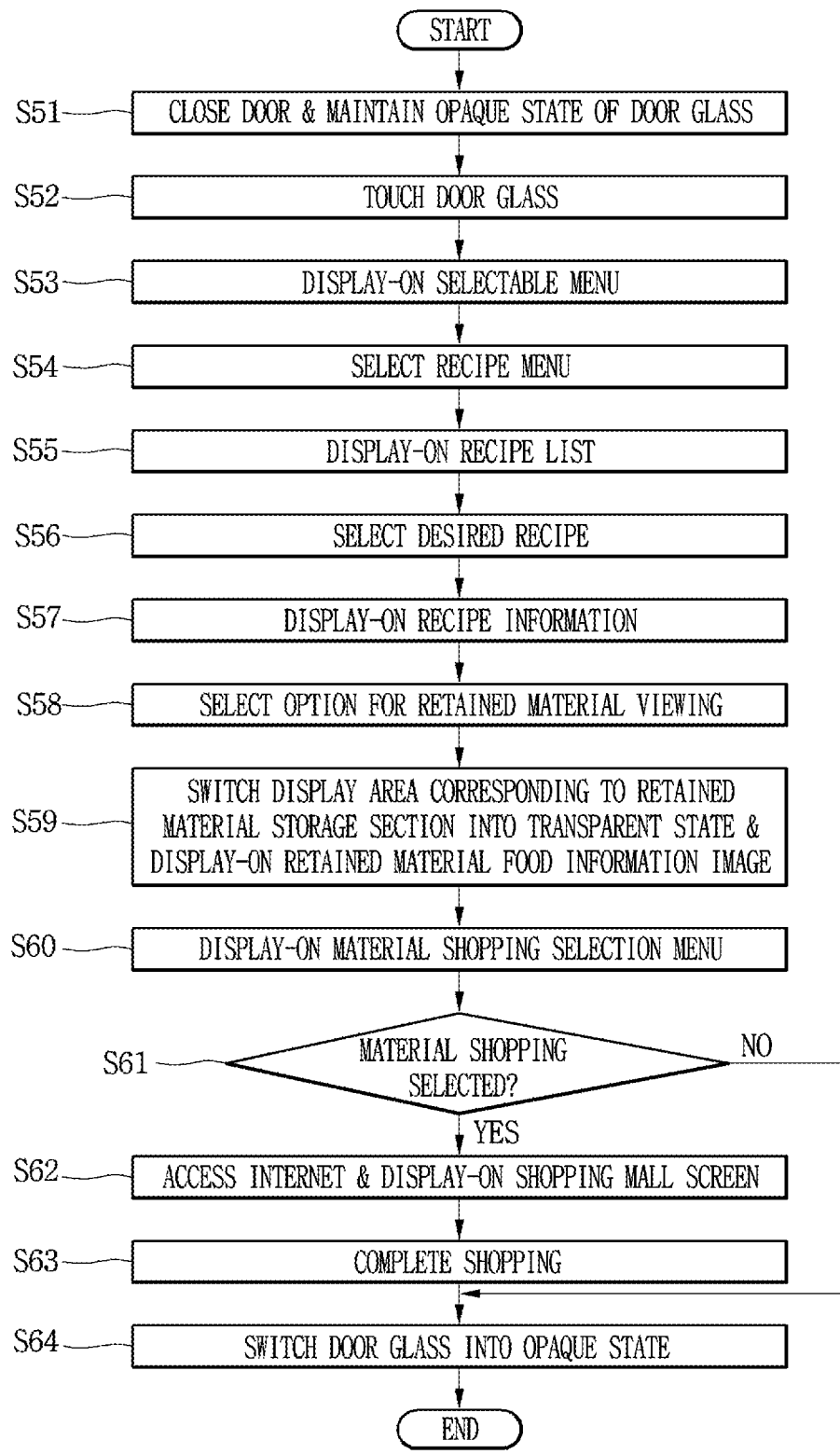
FIG. 8 is a flowchart illustrating an example method for controlling the refrigerator to check retained food materials for a recipe according to one implementation.

FIG. 8 illustrates an example method for controlling the refrigerator to check retained food materials for a recipe according to an implementation.

Referring to FIG. 8, it may initially be assumed that the door 12 is closed and the door glass 122 is maintained in the opaque state (S51). In this state, if the user touches the door glass 122 (S52), selectable menus are displayed-on while the door glass 122 is in the opaque state (S53). Alternatively, the menus may be displayed-on after the door glass 122 is switched into the transparent state.

In further detail, the selectable menus may be provided as touchable icons, and the user may touch and select a recipe menu among the selectable menus (S54). When the recipe menu is selected, a recipe list stored in the memory of the control unit is displayed-on (S55). In this state, the user may touch and select a desired recipe item (S56), and information on a selected recipe is displayed-on (S57).

In detail, the information on the recipe may be output to the front surface of the door glass 122 in the form of a text, an image, or a video. Furthermore, the information on the recipe may include a method of cooking using the recipe and required food material information. An item for selecting an option for viewing a retained material is displayed on one side of a display area in the form of an icon, and the user may touch a retained material viewing icon to select the option for viewing a retained material (S58).

When the option for viewing a retained material is selected, foods required for the recipe, among the foods stored in the refrigerator, are retrieved. Furthermore, the display area of the door glass 122 which corresponds to a storage section in which a currently-stored retained material is located is switched into the transparent state, and, at the same time, an information image for the retained material food is displayed-on (S59). In the case where the door glass 122 is in the transparent state, the information image for the retained material food may be displayed on a point of the door glass 122 which corresponds to the location where the food is stored.

When the information on the currently retained food is displayed on the display area of the door glass 122, the user may check what food is required to be purchased. Furthermore, a material shopping selection menu may be displayed on the display area together with the retained food information so that the user may immediately purchase a required food through online shopping (S60).

If it is determined that the user selects an option for shopping for a material by touching a material shopping menu displayed on a screen (S61), the control unit may immediately establish a connection to the Internet, via a wired or a wireless connection, and a shopping mall screen may be displayed-on (S62). Here, a homepage of a specific shopping mall may be displayed immediately after the connection to the Internet is established, or in some cases, a list of homepages of accessible shopping malls may be listed.

In further detail, when shopping is completed after logging on to an Internet shopping mall (S63), the door glass 122 may be automatically switched into the opaque state (S64). However, in some cases, the door glass 122 may be maintained in the transparent state and then may be switched into the opaque state if the user makes a touch or a set time expires. Furthermore, the user may touch a shopping completion icon displayed on the display area so that a shopping completion signal is input to the control unit.

FIGS. 9 to 12 illustrate example screens displayed on the display area when the method described above with reference to FIG. 8 is performed.

Figure 9:
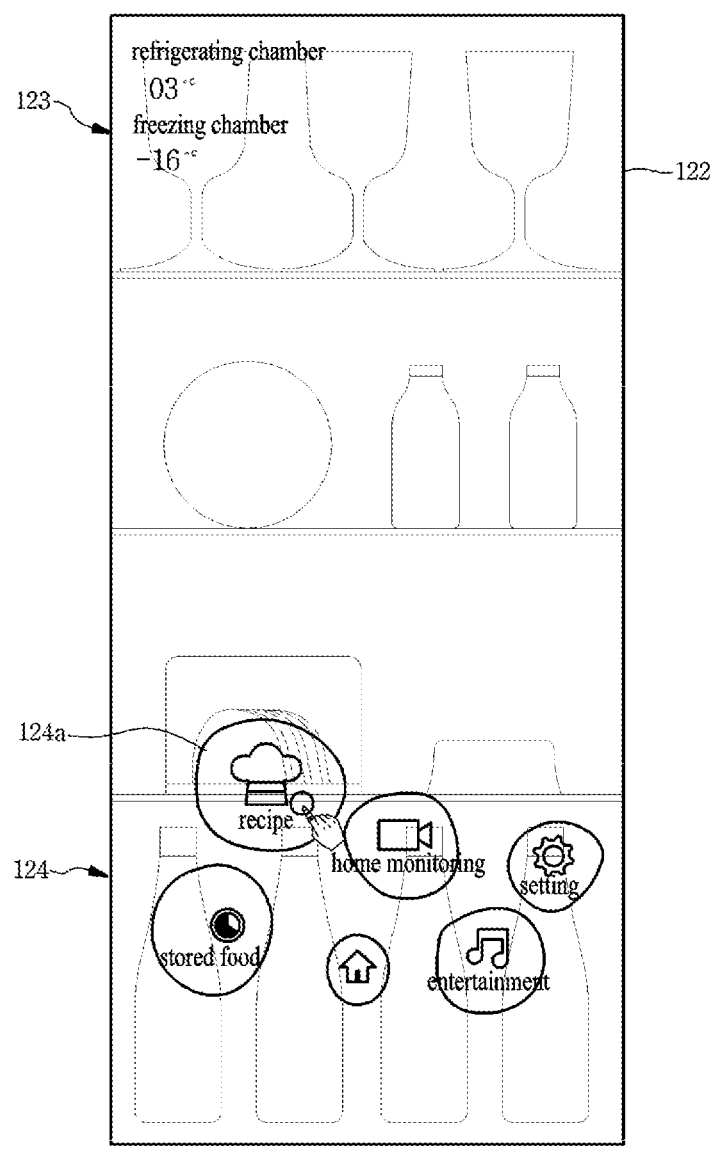
FIGS. 9 to 12 are front views illustrating example screens displayed on a display area when the method described above with reference to FIG. 8 is performed.

Referring to FIG. 9, when the user touches the door glass 122 while the door glass 122 is in the opaque state, selectable menus may be displayed on the door glass 122.

In detail, a storage compartment temperature display part 123 may be disposed on one side of the door glass 122, more specifically, an upper corner of the door glass 122 to display a current temperature of the storage compartment. Storage compartment temperature information displayed on the temperature display part 123 may not be shown when a screen is switched, or may be maintained in a display-on state. Furthermore, a menu display part 124 may be disposed on another side of the door glass 122, and a plurality of recipe selection images 124a may be displayed on the menu display part 124 in the form of a touch icon. The menu display part 124 may be switched into a transparent state or a semi-transparent state to improve the visibility of the recipe selection images 124a. In this state, the user may touch a recipe selection icon so that a screen of a next step may be displayed.

Figure 10:
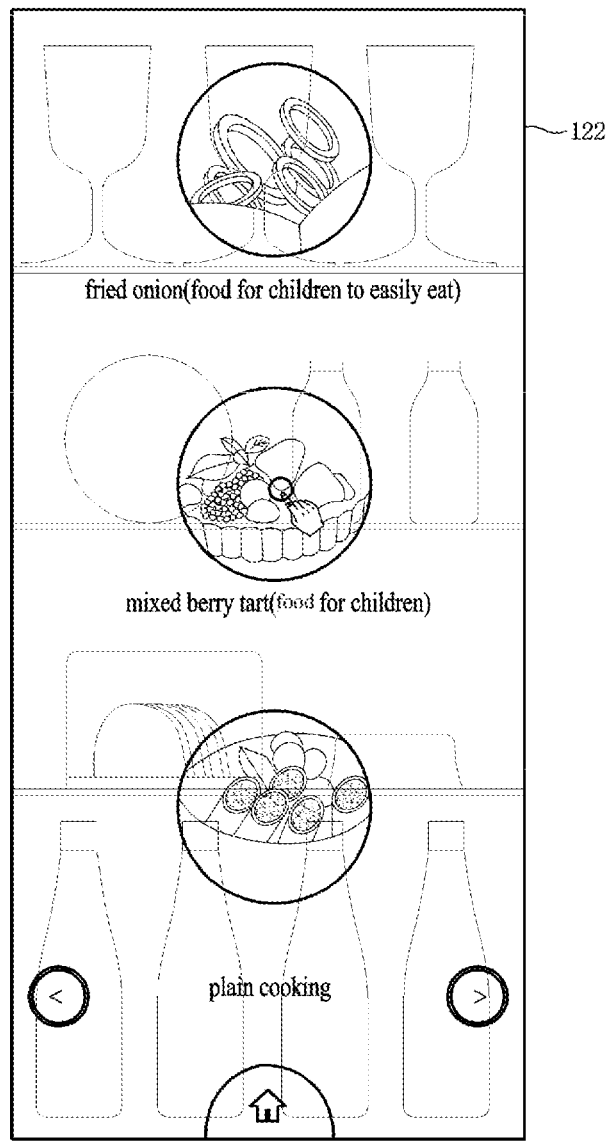

Referring to FIG. 10, when the user touches a recipe selection image among the selection images 124a displayed on the menu display part 124, a plurality of recipes stored in the memory of the control unit may be displayed on the front surface of the door glass 122 in the form of a touch icon. The size or location of the display area on which the recipes are displayed is not particularly limited. That is, recipe lists may be displayed over the door glass 122 as illustrated in FIG. 10, or may be displayed on a specific area. Each recipe selection menu may be displayed in the form of an image or a video showing a recipe name and a dish or a result obtained from a recipe.

In this state, the user may search for and touch a desired recipe, and information on the recipe may be displayed.

Figure 11:
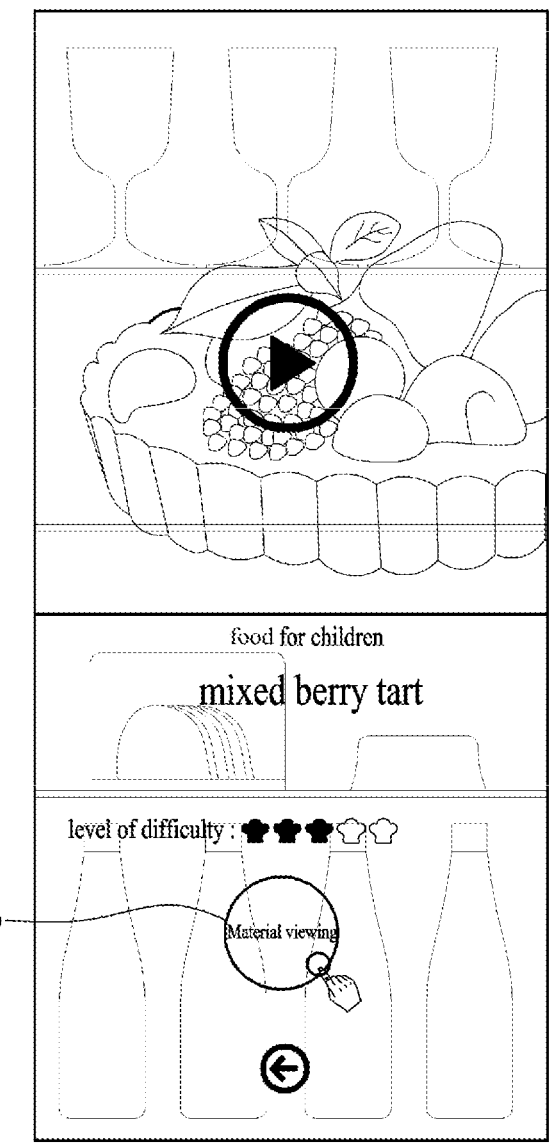

Referring to FIG. 11, when the user touches and selects a desired recipe, information on the recipe is displayed in the form of a text, an image or a video. Furthermore, a retained material viewing selection image 124b may be displayed on one side of the door glass 122 in the form of a touch icon.

In detail, information such as a taste, a nutritional effect, required food materials, and/or a level of cooking difficulty of the recipe may be displayed on one side of the display area of the 122 in the form of a text, an image, or a video.

Figure 12:
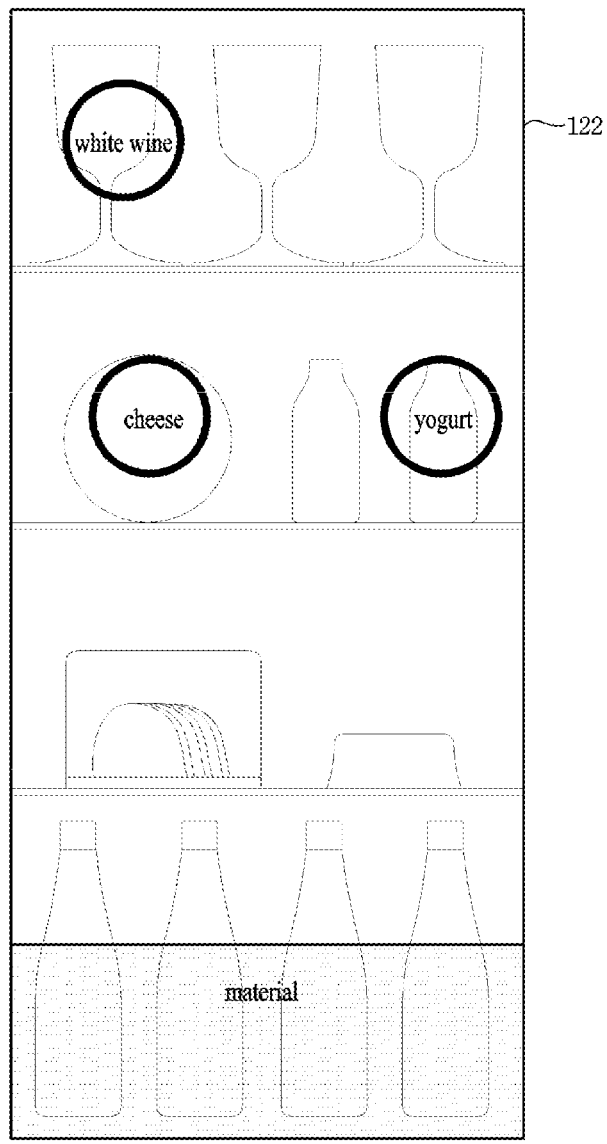

Referring to FIG. 12, when the user selects the retained material viewing selection image 124b, information on a food material stored in the refrigerator, among food materials required for a selected recipe, is displayed on the door glass 122.

In detail, the information on the food material may be displayed, in the form of a food information display image, on the display area of the door glass 122 which corresponds to the location of a storage section in which a corresponding food is stored as described above with reference to FIG. 2. The displayed food information may include a name of the food material. Furthermore, an expiration date and a remaining amount of the food material may be displayed together with the name of the food material.

In this state, a food material shopping selection menu may be displayed on one side of the front surface of the door glass 122 so as to help the user immediately access an Internet shopping mall or the like.

Although implementations have been described with reference to a number of illustrative implementations thereof, it should be understood that numerous other modifications and implementations can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A refrigerator comprising:
a main body defining a storage compartment, the storage compartment being divided into a plurality of storage sections;
a door coupled to the main body to selectively open and close the storage compartment, the door comprising:
a door glass configured to be switched between a transparent state and an opaque state, and
a door frame surrounding one or more edges of the door glass and configured to protect the door glass; and
a controller configured to detect whether the door is closed after being opened,
wherein the door glass is further configured to:
be switched from the opaque state to the transparent state based on a user consecutively touching an area of the door glass two times, and
be switched from the opaque state to the transparent state without being touched by the user based on the controller detecting that the door is closed after being opened.

2. The refrigerator according to claim 1, wherein an entire area of the door glass is configured to, based on the user consecutively touching a specific area of the door glass two times, be switched into the transparent state.

3. The refrigerator according to claim 1, wherein a motion of the user consecutively touching the door glass two times includes a motion of the user consecutively pushing or knocking the door glass two times.

4. The refrigerator according to claim 1, wherein the controller is configured to recognize whether a specific area of the door glass is touched by the user,
wherein the door glass is configured to, based on the controller recognizing that the specific area of the door glass is touched by the user, be switched into the transparent state.

5. The refrigerator according to claim 1, wherein a part of or an entire area of the door glass is configured to be switched into the transparent state based on a touch type.

6. The refrigerator according to claim 1, wherein an area to be switched into the transparent state or a size of an area to be switched into the transparent state is differently determined based on a number of times that the door glass is touched by the user.

7. The refrigerator according to claim 1, wherein, based on the user touching a specific area of the door glass once, only a portion of the door glass including a touched point in the specific area is configured to be switched into the transparent state.

8. The refrigerator according to claim 1, wherein an entire area of the door glass is configured to, based on the controller detecting that the door is closed after being opened, be switched into the transparent state.

9. The refrigerator according to claim 1, wherein the door glass is configured to:
be switched from the opaque state to the transparent state in response to a first touch input; and
based on having been switched to the transparent state in response to the first touch input, display, in response to a second touch input on an area of the door glass by the user, information on food stored in one or more of the plurality of storage sections.

10. The refrigerator according to claim 9, wherein the information of food corresponds to the area of the door glass touched for the second touch input by the user.

11. The refrigerator according to claim 9, wherein an entire area of the door glass is configured to be switched to the transparent state in response to the first touch input.

12. The refrigerator according to claim 9, wherein the door glass comprises a plurality of transparent display areas that are arranged on locations on the door glass corresponding to the plurality of storage sections.

13. The refrigerator according to claim 12, wherein each of the plurality of transparent display areas is associated with corresponding coordinates on the door glass, and wherein the plurality of transparent display areas are configured to display a touch point of the user along with a corresponding food information image.

* * * * *

UNITED STATES PATENT AND TRADEMARK OFFICE
CERTIFICATE OF CORRECTION

PATENT NO. : 10,692,470 B2  
APPLICATION NO. : 16/252220  
DATED : June 23, 2020  
INVENTOR(S) : Jaeyoung Lee et al.

Page 1 of 1

It is certified that error appears in the above-identified patent and that said Letters Patent is hereby corrected as shown below:

On the Title Page

After item (63), Insert:
-- (30) Foreign Application Priority Data
Feb. 12, 2014 (KR) 10-2014-0016090
Feb. 12, 2014 (KR) 10-2014-0016091 -- therefor.

Signed and Sealed this
Twenty-seventh Day of October, 2020

Andrei Iancu
*Director of the United States Patent and Trademark Office*